United States Patent [19]

Bosze et al.

[11] Patent Number: 4,732,802

[45] Date of Patent: Mar. 22, 1988

[54] CERMET RESISTIVE ELEMENT FOR VARIABLE RESISTOR

[75] Inventors: Wayne P. Bosze, Riverside; Ronald L. Froebe, Rubidoux; Gordon McClure, Pasadena; Ronald E. Thomas, Jr.; Philip F. Weingartner, both of Alta Loma, all of Calif.

[73] Assignee: Bourns, Inc., Riverside, Calif.

[21] Appl. No.: 912,875

[22] Filed: Sep. 26, 1986

[51] Int. Cl.[4] .......................... B32B 3/00; B32B 15/00; H01C 10/32

[52] U.S. Cl. .......................... 428/210; 428/432; 428/901; 338/171; 338/312

[58] Field of Search .......................... 428/210, 432, 901; 338/176, 174, 312, 171

[56] References Cited

U.S. PATENT DOCUMENTS

| | | | |
|---|---|---|---|
| 2,950,995 | 8/1960 | Place, Sr. et al. | 117/227 |
| 3,200,010 | 8/1965 | Place, Sr. et al. | 117/212 |
| 3,207,706 | 9/1965 | Hoffman | 252/514 |
| 3,308,528 | 3/1967 | Bullard et al. | 29/155.7 |
| 3,326,720 | 6/1967 | Bruhl, Jr. et al. | 117/227 |
| 3,343,985 | 9/1967 | Vickery | 117/227 |
| 3,353,134 | 11/1967 | Elarde | 338/160 |
| 3,479,216 | 11/1969 | Counts et al. | 117/227 |
| 3,573,229 | 3/1971 | Herbst et al. | 252/514 |
| 3,717,837 | 2/1973 | MacLachlan | 338/160 |
| 3,974,471 | 8/1976 | Gilliland | 338/202 |
| 4,015,231 | 3/1977 | Seno et al. | 338/174 |
| 4,020,445 | 4/1977 | Kelver et al. | 338/312 |
| 4,041,436 | 8/1977 | Kovehich et al. | 338/21 |
| 4,158,831 | 6/1979 | Ragan | 338/174 |
| 4,278,725 | 7/1981 | Riley et al. | 428/208 |
| 4,435,691 | 3/1984 | Ginn | 338/125 |
| 4,495,524 | 1/1985 | Kakuhashi et al. | 338/314 |
| 4,623,482 | 11/1986 | Kuo et al. | 252/512 |
| 4,639,391 | 1/1987 | Kuo | 428/210 |

*Primary Examiner*—John E. Kittle
*Assistant Examiner*—Patrick J. Ryan
*Attorney, Agent, or Firm*—Howard J. Klein; William G. Becker

[57] ABSTRACT

An improved resistive element comprises a film-type resistive layer applied to an insulative substrate and then fired. An array of discrete, spaced apart islands of predominantly conductive material is then applied to the resistive layer in a repetitive pattern having predetermined inter-island spacing. The islands have a conductivity that is substantially greater than the conductivity of the resistive layer. Preferably, the islands are of substantially uniform shape and size. In one preferred embodiment, the islands are formed of a conductive thick film ink that is screen-printed onto a cermet resistive layer through an appropriate mask, and then fired. In another preferred embodiment, the islands are formed of a conductive metal that is applied to the resistive layer by vapor deposition, sputtering, or ion implantation through a suitable mask. Either embodiment of the invention provides a resistive element with lower contact resistance and improved contact resistance stability than prior art film-type resistive elements, while maintaining good linearity, setability, and resolution.

32 Claims, 4 Drawing Figures

CERMET RESISTIVE ELEMENT FOR VARIABLE RESISTOR

BACKGROUND OF THE INVENTION

This invention relates generally to the field of resistive elements used in variable resistors (potentiometers and rheostats). More particularly, it relates to an improved cermet resistive element that provides lower contact resistance and improved contact resistance stability, while maintaining good linearity, resolution, setability, and wear characteristics.

Resistive elements made of thick film cermet inks have achieved widespread usage in the electronics industry. See, for example, U.S. Pat. Nos. 2,950,995; 3,149,002; 3,200,010; 3,207,706; 3,252,831; 3,308,528; 3,326,720; 3,343,985; 3,479,216; and 3,573,229. In fabricating cermet resistive elements, there are several criteria that are sought to be achieved. For example, it is desirable to minimize contact resistance while also maximizing durability (in terms of element and wiper life), thermal stability, resolution, and setability. To a large extent, there must be some trade-off among these goals, especially if cost is a factor.

The contact resistance of a variable resistor is a resistance that is exhibited between the conductive wiper and the resistive element. The contact resistance is actually the sum of two components: a "constriction" resistance and a "tarnish" resistance. The former is proportional to the sum of the wiper and resistive element resistivities, and it is inversely proportional to the effective diameter of the surface-to-surface contact between the wiper and the resistive element. The latter is a function of the resistivity of contaminants or oxide films which may occupy the contact area.

The prior art has taken a number of approaches toward minimizing contact resistance. A common approach is the use of multi-fingered wipers to increase the number of contact points. To reduce the "tarnish" resistivity, noble metals are used in the wipers. Both of these approaches add appreciably to the expense of manufacture. Another approach is to increase the force of the wiper against the resistance element. This technique, however, reduces the life expectancy of the wiper and the resistive element. The prior art has also employed chemical and mechanical (i.e., abrasive) means to remove surface irregularities and contaminants on the resistive film. Such surface treatments, however, may create changes in the total resistance of the element and induce instabilities.

An approach that has shown some promise is that of lowering the surface resistivity of the resistive element at the point of contact with the wiper, without significantly lowering the bulk resistivity of the element, thereby maintaining the desired total resistance. An example of such a technique is disclosed in U.S. Pat. No. 3,717,837 to MacLachlan. The technique disclosed therein comprises the vapor deposition of noble metal (e.g., gold, palladium, rhodium, or platinum) onto the surface of a vapor-deposited cermet resistive element. The result, as stated in the MacLachlan patent, is to decrease contact resistance while only slightly lowering the total resistance of the cermet element.

While the approach taught by the MacLachlan patent shows promise, there are still drawbacks. For example, the random shape, size, and distribution of the conductive metal "islands" on the cermet surface can result in problems of resolution, linearity, and setability, due to an uneven distribution of the islands, and due to the irregular shapes and sizes of the islands. Moreover, the high conductivity of the vapor-deposited noble metal requires careful control of its application in order to avoid unwanted shunting of the resistive element and the resultant excessive lowering of its total resistance.

It can thus be appreciated that the prior art, while recognizing the need to lower contact resistance, has not yet developed the ability to do so without seriously compromising other important design considerations.

SUMMARY OF THE INVENTION

Broadly, the present invention is an improved film-type resistive element, wherein the improvement comprises the application, on the surface of the resistive element, of an array or matrix of discrete relatively high conductivity islands, in a repetitive pattern, with predetermined spacing between the islands. More particularly, the pattern is configured to allow the wiper of the variable resistor to make electrical contact with as many equi-potential islands as posslble, without shorting out any more of the length of the resistor element than is necessary. This provides numerous "make-before-break" steps, resulting in very fine resolution. In one preferred embodiment, the islands are formed of a high conductivity thick film ink that is screen printed onto a cermet resistive element layer ("base layer") after the base layer has been sintered ("fired"). In another preferred embodiment, the islands may be formed of a noble metal that is deposited (by vapor deposition, sputtering, or ion implantation) through a mask conforming to the desired pattern. In any embodiment, the islands are preferably of substantially uniform shape and size.

As will be set forth in greater detail below, several types of materials are suitable for the islands. For example, thick film inks having a high percentage (by weight) of gold or lead ruthenate have shown good results, with ruthenium dioxide, silver, and silver/palladium alloy inks also showing promise. In the vapor deposition embodiment of the invention, nickel/chrome alloys have yielded good results, with noble metals (especially gold) being preferred in high temperature environments where nickel/chrome may be prone to oxidation.

The present invention thus provides a repetitive pattern, with predetermined spacing, of uniformly-sized and uniformly-shaped islands on the base layer, wherein the islands are of a measurably higher conductivity (lower resistivity) than the base layer. The islands exhibit a relatively high surface conductivity, as compared to the base layer, but their bulk conductivity does not add appreciably to that of the base layer. The result is substantially diminished contact resistance without an intolerable decrease in the total resistance of the resistive element. In addition, contact resistance stability is enhanced even under low current ("dry circuit") conditions. Moreover, the repetitive pattern, comprising a multiplicity of islands, provides excellent linearity and setability, along with fine resolution. Indeed, the parameters of linearity, setability, and resolution can be varied, according to need, by using different spacing, sizes, and shapes for the islands.

Still another advantage is that the uniformity and regularity of the islands minimizes the possibility of direct contact between the wiper and the base layer, thereby contributing to low contact resistance, while also maintaining good linearity and setability. Wiper wear is substantially reduced in most instances by the wiper's contact with the relatively smooth islands, rather than with the relatively abrasive base layer. Likewise, the wear on the resistive element is usually substantially reduced.

A further advantage provided by the regular pattern of uniform islands is the ability to provide high yields in electrical conformity under high volume production, a result that is difficult (if not impossible) to achieve with the random island distribution of the prior art.

The advantages discussed above, as well as others exhibited by the present invention, will be better understood from the detailed description which follows.

DETAILED DESCRIPTION OF THE INVENTION

Figure 1:
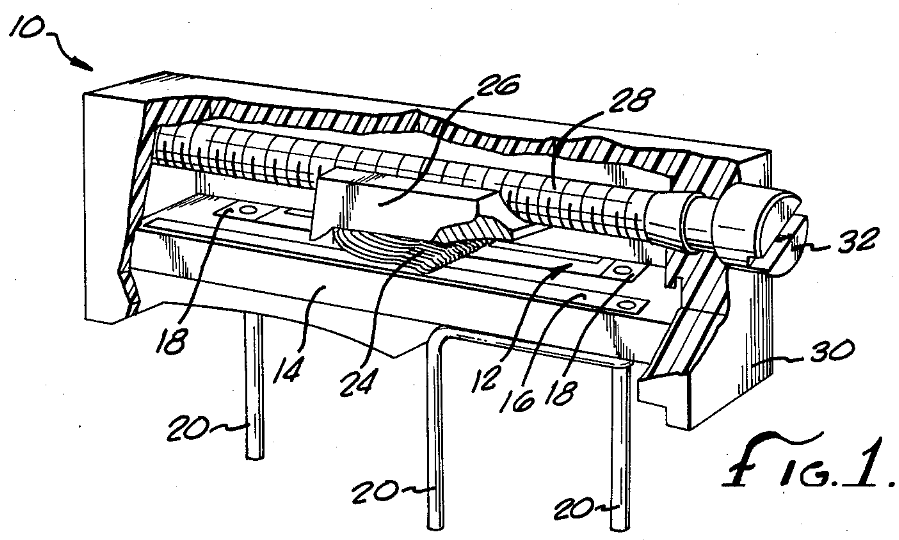
FIG. 1 is a perspective view, partially broken away, of a variable resistor incorporating a resistive element constructed in accordance with the present invention.

Referring now to the drawings, FIG. 1 shows a variable resistor 10 of one type that advantageously incorporates a film-type resistive element 12 constructed in accordance with the present invention. The variable resistor 10 is a linear action type, but it should be understood that the present invention is adaptable to a wide variety of variable resistors, including rotary action types as well as linear action types.

The variable resistor 10, apart from the resistive element 12 (to be described below), is a conventional device, well-known in the art, and need only be described sufficiently to put the present invention in its proper context. Accordingly, the variable resistor 10 may simply be described as comprising an insulative substrate 14 (typically a ceramic material), the top surface of which is provided with the resistive element 12 and a conductive collector element 16, arranged as substantially parallel strips. The resistive element 12 is terminated at each end by a conductive termination 18, each of which is conductively connected to a lead 20 that extends through the lower surface of the substrate 14. Likewise, one end of the collector strip is conductively connected to a third lead 20.

A wiper 24 is attached to the underside of a carrier 26, the latter engaging a lead screw 28 for moving the wiper 24 along the resistive element 12 and the collector element 16. The wiper 24 is advantageously of the multi-fingered type as shown, but the particular configuration of the wiper is not critical to the invention. Likewise, the mechanism for moving the carrier may be of any appropriate type of the several known in the art.

Finally, the substrate 14, the wiper 24, the carrier 26, and the body of the lead screw 28 are encased within a housing 30 which is typically of a suitable plastic. The lead screw 28 has a head 32 which protrudes from one end of the housing, and which is configured for manipulation by an appropriate tool (e.g., a screwdriver).

Figure 2:
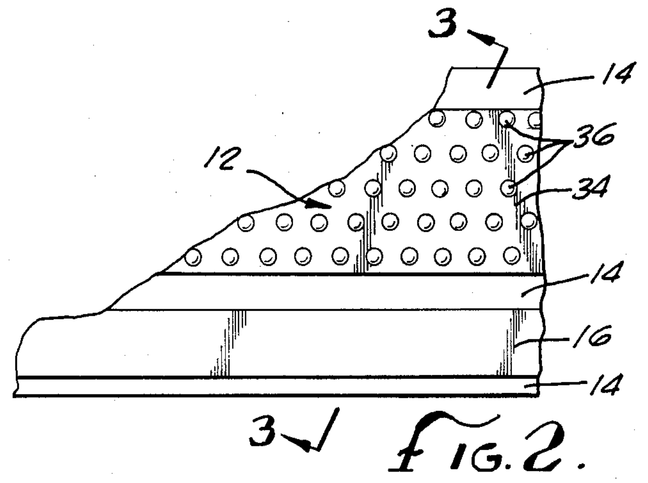
FIG. 2 is a fragmentary plan view of the resistive element in the variable resistor of FIG. 1.
Figure 3:
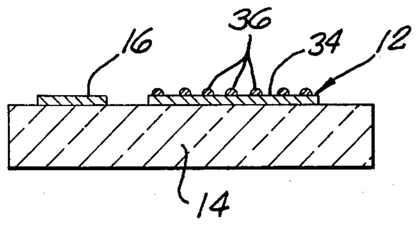
FIG. 3 is a cross-sectional view taken alone line 3—3 of FIG. 2.
Figure 4:
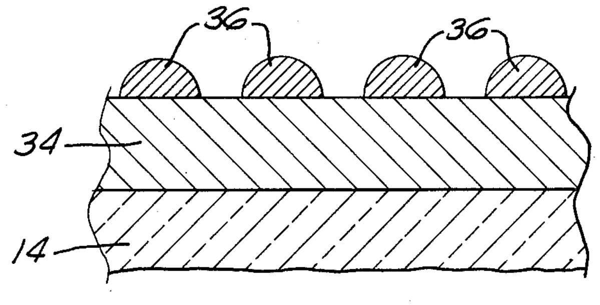
FIG. 4 is a detailed, enlarged view of a portion of FIG. 3.

The novel resistive element 12 of the present invention is illustrated in FIGS. 2, 3, and 4. The resistive element 12 comprises a base layer 34 which is preferably a film of cermet material, onto which is applied an array or matrix of conductive "islands" 36. The base layer 34 is preferably formed of any of several commercially-available cermet thick film inks, as will be discussed more specifically below. The base layer 34 is applied by conventional screen printing techniques, and it is then sintered ("fired") before the array of islands 36 is applied to it by any of the methods described below. Alternatively, the base layer 34 may be a thin film cermet applied by a technique such as vapor deposition, as is known in the art. The base layer 34 could also be a film of carbon filled polymer (here called conductive plastic) having a known resistivity.

The islands 36 are formed of a material that is substantially more conductive than the material of the base layer 34, preferably having a resistivity of at least approximately one order of magnitude less than that of the base layer material. Several types of materials are suitable for forming the islands. A preferred material is a thick film ink having a gold content of approximately 85 percent to 92 percent by weight. High metal content thick film inks may be used that have other metals as their predominant component, such as, for example, silver and silver/palladium alloy. Also, cermets which are predominantly lead ruthenate or ruthenium dioxide may yield the desired results in certain base layer materials. (Such thick film inks might not, however, be suitable on a base layer of conductive plastic.) The islands may also be formed of a substantially pure conductive metal, preferably a noble metal such as gold. Nickel/-chromium alloy also yields good results, but it may tend to oxidize, especially in high temperature environments. Conductive plastics may also be suitable for the islands, especially where a conductive plastic (of lower conductivity) is used for the base layer.

The method used to apply the islands 36 to the base layer 34 depends upon the material of which they are made. Specifically, if the islands are to be formed of a substantially pure metal, such as a noble metal or a nickel/chromium alloy, they may be applied by vapor deposition, sputtering, or ion implantation through a mask that is appropriately configured to the desired pattern, as will be explained more fully below. If the islands are made of an ink with a predominant conductive component, conventional screen printing techniques can be used, again using an appropriately configured screen or mask. A second firing is then performed to sinter the islands. With any method, the best results are achieved if the base layer is fired before the islands are applied. When certain thick film inks are used for the islands, care must be taken during the application procedure, especially during the second firing, to prevent "encapsulation" of the islands, a phenomenon in which the islands are glazed over by the non-metallic (glass, refractory, or oxide) component of the thick film ink from which they are formed. Such encapsulation or overglazing results in a high surface resistivity, thereby nullifying the desired result of low contact resistance.

To provide good setability, the islands should be of substantially uniform shape and size, and they should be applied in a repetitive pattern with predetermined inter-island spacing. While the particular pattern used is not critical, best results are achieved with a pattern wherein the wiper 24 makes electrical contact with the greatest number of islands on or near the same equi-potential line on the resistive element 12 at all times throughout its travel from one end of the resistive element to the other. Many such patterns could easily be devised by those of ordinary skill in the pertinent arts, the pattern illustrated in the drawings being merely representative. Typically, the predetermined spacing between the islands will be substantially uniform throughout the array. In certain instances, however, the spacing will not be uniform. For example, in an arcuate resistive element for a rotary variable resistor, the spacing may be varied in a predetermined manner in the radial direction to maintain uniform current densities. Also, spacing may be changed in a predetermined manner along the path of wiper travel if a nonlinear resistance function is desired. The particular shape and size of the islands, likewise, are not critical parameters, except that the thickness of the islands, that is, their height above the surface of the base layer 34, should be uniform. It will be appreciated that resolution is improved by minimizing the size of the islands and the spacing between them, consistent with the other design criteria discussed above.

By way of a specific example, an experimental resistive element in accordance with the present invention was prepared with a base layer of a commercially-available cermet resistor ink comprising (before firing) approximately 30 percent bismuth ruthenate and approximately 35 percent to 40 percent lead borosilicate glass, with the balance being volatile vehicles. (All percentages are by weight.) The sheet resistivity was one kilohm per square at 10 microns of thickness. The islands were of a commercially-available gold cermet ink comprising approximately 90 percent gold by weight, the balance being glass and volatile vehicles, with a sheet resistivity in the range of approximately 2 to 10 milliohms per square at 10 microns of thickness. The gold cermet ink was applied to the surface of the cermet through a suitable mask after the cermet had been properly fired. The resistive element was then re-fired to sinter the gold cermet ink. The resulting resistive element demonstrated measurably reduced contact resistance as compared with a control element comprising the same cermet resistive layer without the islands. The reduction in total resistance was within tolerable limits. Similar results were obtained with the base layer formed of a cermet resistor ink comprising approximately 25 percent bismuth ruthenate and 35 percent to 40 percent lead borosilicate glass, with a sheet resistivity of 10 kilohms per square at 10 microns of thickness.

The reduction in contact resistance achieved in the tested samples is believed to be the result of the metallurgical bond (meaning a continuous metal link) that forms between each island and the surrounding resistive film, as well as of the inherent conductivity of the islands themselves. More specifically, without the islands, the contact resistance is the resistance through the mechanical pressure junction between the highly conductive wiper and the high resistivity cermet film.

With the islands, the contact resistance of the wiper-to-cermet pressure junction is replaced by a wiper-to-island pressure junction in series with the bulk conductivity of the island and the conductivity of the electrically conductive junction provided by the aforementioned metallurgical bond. The bulk conductivity of the island and the conductivity of the metallurgical bond junction each can be several orders of the magnitude greater than the conductivity of the wiper-to-cermet pressure junction.

In summary, the present invention provides a resistive element with significantly reduced contact resistance, and with measurable improvement in contact resistance stability, as compared to prior art film-type resistive elements. These benefits are achieved without sacrificing good linearity and setability, while maintaining the ability to achieve fine resolution. Moreover, repeatability and uniformity of electrical characteristics on a mass production basis can be readily achieved. Furthermore, increased operational lifetime is typically achieved through reduced wiper and resistive element wear. In many instances, reduced contact resistance variation (CRV) is also achieved.

The embodiments of the invention described herein are exemplary as preferred embodiments. Those skilled in the pertinent arts may devise modifications and variations to suit particular needs. For example, as mentioned above, there may be a wide variety of patterns for the islands that will yield satisfactory results. Moreover, modifications and variations in the materials employed may be developed, as will the techniques of applying the island-forming material onto the base layer. For instance, thick film inks with noble metals other than gold, silver, and palladium might conceivably be employed for the islands. As a further example, either the base layer or the islands may be formed of conductive plastics, as previously mentioned. These and other modifications that may suggest themselves are to be considered within the spirit and scope of the present invention.

What is claimed is:

1. A resistive element for a variable resistor or the like, comprising:

an insulative substrate;

a layer of resistive film on said substrate, said resistive film being substantially of a material selected from the group consisiting of cermets and carbon-filled polymers; and an array of discrete, spaced-apart islands of predominantly conductive material formed on the surface of said layer in a repetitive pattern of predetermined spacing, said predominantly conductive material being selected from the group consisting of high metal content thick film inks, high metal oxide content thick film inks, substantially pure conductive metal, and carbon-filled polymers, whereby the interfaces between said islands and said layer form electrically conductive junctions between said islands and said layer.

2. The resistive element of claim 1, wherein said resistive film is cermet.

3. The resistive element of claim 1, wherein said islands are substantially of uniform size and shape.

4. The resistive element of claim 2, wherein said islands are formed of a high metal content thick film ink.

5. The resistive element of claim 4, wherein said thick film ink has a metallic component selected from the group consisting of gold, silver, and silver/palladium alloy.

6. The resistive element of claim 5, wherein said islands are predominantly a material selected from the group consisting of ruthenium dioxide and lead ruthenate.

7. The resistive element of claim 1, wherein said islands are substantially pure conductive metal.

8. The resistive element of claim 7, wherein said metal is a noble metal.

9. The resistive element of claim 7, wherein said metal is an alloy of nickel and chromium.

10. A resistive element for a variable resistor or the like, comprising:

an insulative substrate;

a layer of resistive film on said substrate, said layer having a first conductivity; and an array of discrete, spaced-apart islands on the surface of said layer in a repetitive pattern with predetermined spacing, said islands being formed of a material having a second conductivity which is greater than said first conductivity.

11. The resistive element of claim 10, wherein said repetitive pattern has substantially uniform spacing.

12. The resistive element of claim 10, wherein said resistive film is a cermet.

13. The resistive element of claim 12, wherein said islands are formed from a high metal content thick film ink.

14. The resistive element of claim 13, wherein said thick film ink has a metallic component selected from the group consisting of gold, silver, and silver/palladium alloy.

15. The resistive element of claim 14, wherein said islands are predominantly a material selected from the group consisting of ruthenium dioxide and lead ruthenate.

16. The resistive element of claim 11, wherein said islands are of substantially uniform shape and size.

17. The resistive element of claim 10, wherein said islands are formed substantially from a noble metal.

18. The resistive element of claim 10, wherein said islands are formed substantially from an alloy of nickel and chromium.

19. A resistive element for a variable resistor or the like, comprising:

an insulative substrate;

a cermet layer on said substrate; and an array of discrete islands of predominantly conductive material formed on the surface of said cermet layer in a repetitive pattern, said islands being of substantially uniform size and shape, with a conductivity greater than the conductivity of said cermet layer.

20. The resistive element of claim 19, wherein said islands are formed of a high metal content thick film ink.

21. The resistive element of claim 20, wherein said thick film ink has a metallic component selected from the group consisting of gold, silver, and silver/palladium alloy.

22. The resistive element of claim 21, wherein said islands are predominantly a material selected from the group consisting of lead ruthenate and ruthenium dioxide.

23. The resistive element of claim 19, wherein said islands are substantially pure conductive metal.

24. The resistive element of claim 23, wherein said metal is a noble metal.

25. The resistive element of claim 23, wherein said metal is an alloy of nickel and chromium.

26. The resistive element of claim 19, wherein said cermet layer is a thick film.

27. The resistive element of claim 2, wherein said islands are formed of a high metal oxide content thick film ink.

28. The resistive element of claim 1, wherein said resistive film is a first carbon-filled polymer having a first conductivity, and wherein said islands are formed of a second carbon-filled polymer having a second conductivity higher than said first conductivity.

29. The resistive element of claim 10, wherein said resistive film is a carbon-filled polymer.

30. The resistive element of claim 29, wherein said resistive film is formed from a first carbon-filled polymer having a first conductivity, and wherein said islands are formed of a second carbon-filled polymer having a second conductivity higher than said first conductivity.

31. The resistive element of claim 12, wherein said islands are formed from a high metal oxide content thick film ink.

32. The resistive element of claim 19, wherein said islands are formed from a high metal oxide content thick film ink.

* * * * *

UNITED STATES PATENT AND TRADEMARK OFFICE
CERTIFICATE OF CORRECTION

PATENT NO. : 4,732,802

DATED : March 22, 1988

INVENTOR(S) : Wayne Bosze et al.

It is certified that error appears in the above-identified patent and that said Letters Patent is hereby corrected as shown below:

Column 6, Line 56, "of claim 5" should read -- of claim 27 --

Column 7, Line 21, "of claim 14" should read -- of claim 31 --

Column 8, Line 7, "of claim 21" should read -- of claim 32 --

Signed and Sealed this

Eighth Day of November, 1988

*Attest:*

DONALD J. QUIGG

*Attesting Officer*

*Commissioner of Patents and Trademarks*